United States Patent [19]

Delfer, III et al.

[11] Patent Number: 5,496,991
[45] Date of Patent: Mar. 5, 1996

[54] AUTOMATED REMITTANCE SYSTEM

[76] Inventors: Frank W. Delfer, III, 7560 Shelborne Dr., Loomis, Calif. 95650; Barry D. Stigers, 5332 Rimwood Dr., Fair Oaks, Calif. 95628

[21] Appl. No.: 281,522

[22] Filed: Jul. 26, 1994

Related U.S. Application Data

[63] Continuation of Ser. No. 879,061, Apr. 30, 1992, abandoned, which is a continuation of Ser. No. 309,267, Feb. 9, 1989, abandoned.

[51] Int. Cl.$^6$ .................................................. G06F 17/60
[52] U.S. Cl. .............................................. 235/379; 902/40
[58] Field of Search .................................... 235/379, 380; 902/40; 253/58

[56] References Cited

U.S. PATENT DOCUMENTS

| | | | |
|---|---|---|---|
| 1,946,751 | 10/1932 | McCarthy | 229/92.3 |
| 3,852,571 | 12/1974 | Hall et al. | 235/379 |
| 3,977,597 | 8/1976 | Wise et al. | 229/73 |
| 4,093,117 | 6/1978 | Morse | 229/70 |
| 4,270,042 | 5/1981 | Case | 235/379 |
| 4,358,671 | 11/1982 | Case | 235/379 |
| 4,417,136 | 11/1983 | Rushby et al. | 235/375 X |
| 4,502,713 | 3/1985 | Conti | 283/116 |
| 4,585,160 | 4/1986 | Fiske, II | 229/92.3 |
| 4,608,485 | 8/1986 | Miura | 235/379 |
| 4,650,975 | 3/1987 | Kitchener | 235/375 |
| 4,673,802 | 6/1987 | Ohmae et al. | 235/379 |
| 4,682,014 | 7/1987 | Iwama | 235/375 |
| 4,696,034 | 9/1987 | Wiedemer | 380/16 |
| 4,706,877 | 11/1987 | Jenkins | 229/73 |
| 4,727,243 | 2/1988 | Savar | 235/379 |
| 4,743,743 | 5/1988 | Fukatsu | 235/379 |
| 4,743,747 | 5/1988 | Fougere et al. | 235/494 |
| 4,752,675 | 6/1988 | Zetmeir | 235/375 |
| 4,760,532 | 7/1988 | Sansone et al. | 364/464.03 |
| 4,760,534 | 7/1988 | Fougere et al. | 364/466 |
| 4,777,354 | 10/1988 | Thomas | 235/380 |
| 4,836,109 | 4/1989 | Dvorzsak | 102/312 |
| 4,851,650 | 7/1989 | Kitade | 235/379 |
| 4,948,174 | 8/1990 | Thomson et al. | 283/58 |
| 4,974,878 | 12/1990 | Josephson | 283/58 |
| 5,121,945 | 1/1992 | Thomson et al. | 283/58 |

*Primary Examiner*—Richard A. Rosenberger
*Attorney, Agent, or Firm*—James M. Ritchey

[57] ABSTRACT

An automated remittance system, method, and associated remittance document are disclosed whereby consumers' pre-authorizations are obtained by a billing system provider to initiate an electronic transfer of Funds from the consumers' depository accounts to a vendor's depository account upon the provider's scanning and verifying the returned remittance documents that have unique current billing indicia. Computer means control the system and maintain currency of all associated data base files as well as generate the remittance documents.

3 Claims, 1 Drawing Sheet

AUTOMATED REMITTANCE SYSTEM

CROSS-REFERENCE TO RELATED APPLICATIONS

This is a continuation of application Ser. No. 07/879,061 filed on Apr. 30, 1992 which was a FWC of abandoned Ser. No. 07/309,267 filed on Feb. 9, 1989.

BACKGROUND OF THE INVENTION

1. Field of the Invention

The subject invention relates to a system and method for automated remittance of payments from consumers to vendors and an associated remittance document. A billing service provider or vendor obtains pre-authorization from consumers to initiate electronic funds transfer transactions upon the provider's or vendor's receipt and verification of remittance documents from the consumers.

2. Description of the Background Art

For numerous reasons (such as lack of expertise or lack of computer facilities), many goods and services vendors find the process of billing their consumers to be a cost ineffective endeavor. Therefore, vendors frequently have billing service providers handle the billing process, including preparation of statements for the consumers, collection of funds, generation of reports, and similar duties. Even with these services the collecting and transferring of funds from the consumers to the vendors has required wasted time and costs.

U.S. Pat. No. 4,650,975 discloses an identifying card and a system of employing these cards for transferring funds upon consumers' requests. This system is directed to security problems associated with the transfer of funds.

Described in U.S. Pat. No. 4,682,014 is a simple data input apparatus including a magnetic card reader. This patent is not immediately related to the subject invention.

U.S. Pat. No. 4,696,034 relates a high security pay television system in which the usage is accumulated at a central point for later billing. Included is a removable memory module for return to the billing facility.

Disclosed in U.S. Pat. No. 4,743,747 is a postage and mailing information applying system. Encrypted messages containing postage fees are applied to pieces of mail for high speed authentication.

U.S. Pat. No. 4,752,675 illustrates a method of collecting response data from direct mail advertising. The effectiveness of the advertising is determined by analyzing the returned documents with a master file. In contrast to the subject invention, no funds are transferred and no consumer pre-authorizations are involved in this process. Similarly, both U.S. Pat. Nos. 4,760,532 and 4,760,534 disclose a mailing system with both postage value transfer and accounting capabilities, but these are related to keeping track of postage and not involved with the pre-authorized electronic transfer of funds.

U.S. Pat. No. 4,777,354 relates a system for controlling the supply of utility services to consumers. Little, if any, overlap with the subject invention exists. An actuator card is inserted by the consumer into a device to initiate the desired services and to facilitate billing.

Various mailers have been disclosed in the prior art. U.S. Pat. No. 1,946,751 discloses a bank check postcard folder. The folder allows a company to mail a check to a party by using the same name and address as appears on the actual check. A statement of the account may be included. Likewise, U.S. Pat. No. 4,585,160 describes a negotiable instrument mailing device that allows the recipient to use the same mailer, refolded, to return the requested information.

U.S. Pat. Nos. 3,977,597 and 4,706,877 relate to one piece, two-way mailer. The return stub portion in '597 is detached and inserted into a mailer, the refolded original mailer, with the payment and posted. For the '877 patent, the return stub is inserted into a return mailer that is prepared by the consumer by pealing off the original address label to expose a new pre-printed address.

U.S. Pat. Nos. 4,093,117 and 4,502,713 disclose postal forms suitable for mailing messages, bills, advertisements, and similar information to consumers. An internal slide card is provided with the '117 disclosure. To read the information supplied by the form, the consumer snaps the slide card out of the envelope. The form provided in the '713 patent is designed to eliminate difficulties arising from the contact of glue with printing equipment.

Disclosed in U.S. Pat. No. 4,836,109 is a coded document and document reading system. This invention is designed to facilitate the reading of documents with markable areas and having coded pattern signatures. Once the document is scanned by a video camera and the image stored, the position within the stored pixel data of each of the markable locations on the card document is determined by analyzing the identifying signatures. This system permits the location of the markable areas regardless of the physical orientation of the document card.

SUMMARY OF THE INVENTION

An object of the present invention is to present an improved system and method for electronically transferring funds from a consumer to a vendor.

Another object of the present invention is to produce an improved remittance system that is rapid, automated, and applicable to large numbers of vendors and consumers by a billing service provider employing the invention.

A further object of the present invention is to provide an electronic funds transfer system and method that limits a vendor's or billing service provider's access to electronically transferred funds to transactions initiated by consumers physically mailing a remittance document to activate the transfer.

An additional object of the present invention is to furnish an automated remittance system and method that results in consumers' payment funds being available to vendors within an acceptably short period of time.

Yet another object of the present invention is to provide a remittance device that serves to inform the consumer of the charges due and to trigger the electronic funds transfer when an associated remittance document is returned to the vendor or billing service provider.

The subject invention, an automated remittance system, comprises a computer means that controls the electronic transfer of funds from consumers' depository accounts to vendors' depository accounts as directed by an overseeing billing service provider. A billing service provider (or vendor) employs a system programmed computer means having vendor data base files and consumer payment transaction data base files that are periodically updated to maintain currency. Consumers have, prior to the first billing for services or goods, authorized the billing service provider (or vendor) to electronically transfer funds from their designated depository accounts into appropriate vendors' depository accounts upon the billing service provider's receipt and verification of a remittance document. The remittance document is encoded by the computer means with consumer specific unique current billing indicium that is readable by an automated scanning device at the billing service provider's facility. The information gathered by scanning the remittance documents and transmitting to the computer means comprises the current consumer payment transaction disposition data. Data bases are updated with this current consumer payment transaction disposition data. The funds transfer transaction is processed by the computer means and the electronic funds transfer initiating information sent to appropriate consumers' depositories.

The remittance document of the subject invention is a mailing device pre-addressed to the billing service provider and encoded with consumer unique current billing indicium. Upon automatic reading by the billing service provider, the remittance document serves to trigger the electronic transfer of funds.

Other objects, advantages, and novel features of the present invention will become apparent from the detailed description that follows, when considered in conjunction with the associated drawings.

DESCRIPTION OF THE PREFERRED EMBODIMENT

Figure 1:
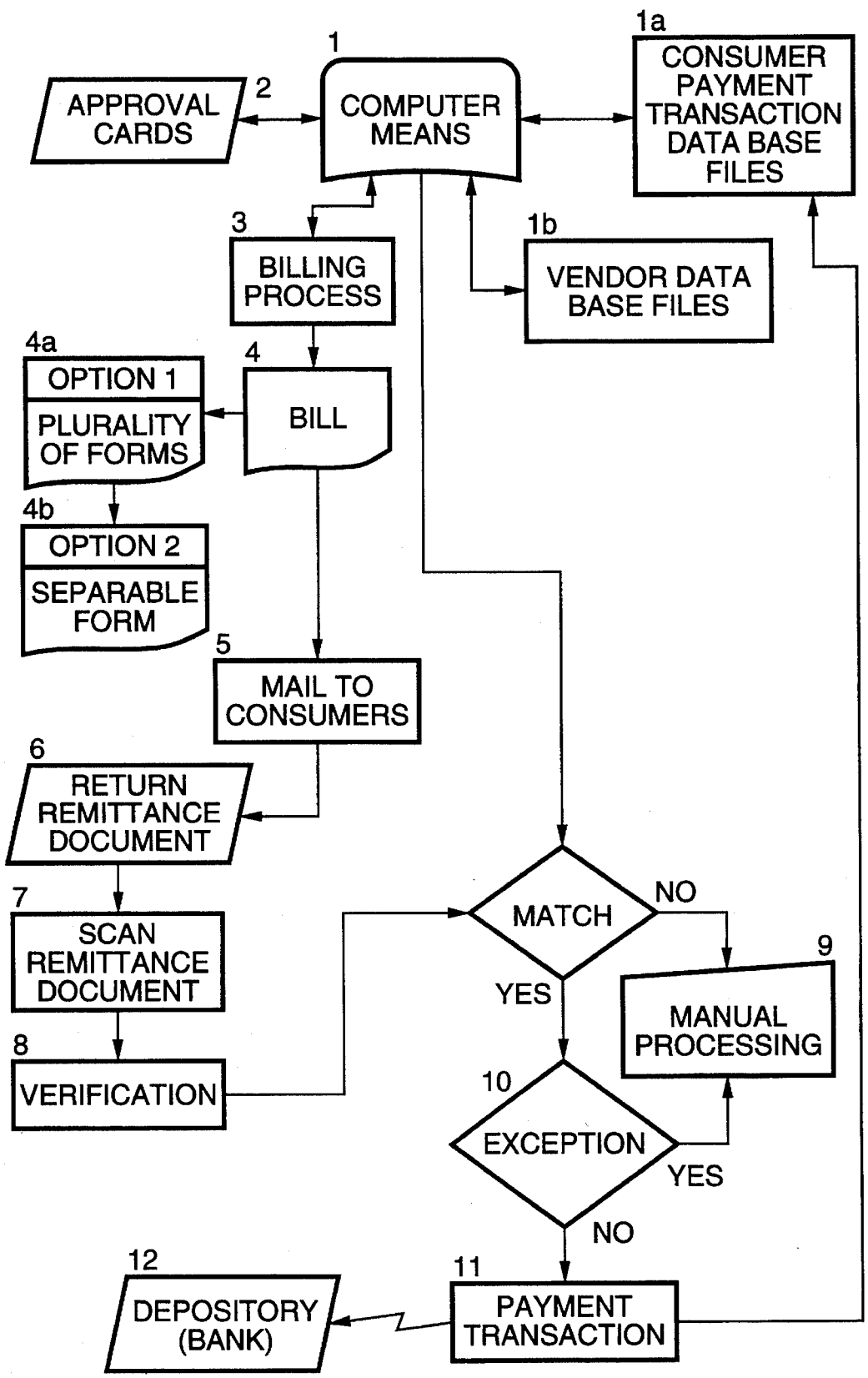
FIG. 1 is a flow chart of the subject invention.

The subject invention system is for the rapid electronic transfer of funds from a consumer's depository account into a vendor's depository account. Although the subject invention is described generally in terms of a billing service provider handling the billing process, contracted with by a vendor, this is for illustrative purposes only and the subject invention is employed equally well by individual vendors for their consumers. Further, this system is applicable to sales, rentals, and leases of goods and services or similar transactions and exchanges between two or more parties. For illustrative example, a billing service provider for cable television vendors might employ this system for billing each of its vendors' consumers.

Referring now to FIG. 1, there is shown a flow chart of a preferred embodiment of the automated remittance system and method of the subject invention. The billing service provider acts as a central processing facility for billing consumers of vendor clients. A computer means 1 is programmed to control the functions of the subject system by standard procedures well known in the art. Any commercially available computers with capabilities adaptable to the subject system are contemplated, as well as newly designed computers or modified existing computers. Preferably, the computer means comprises at least two separate, but communicating, computers. A first computer to control the overall operation of the system, including storage means for data base files and means for maintaining the currency of these data base files, and a second computer that directs the statement generating process and the production of the consumer bills are contemplated by this disclosure. It is understood that when the term computer is employed in this disclosure, it includes a plurality of computers that function together as an operational unit.

Consumers are introduced to the subject invention automated remittance system by literature distributed by either the vendors or preferably the billing service provider. Accompanying the informational materials are approval cards 2. Also, direct telephone or personal contact with the consumers, followed by mailed approval cards 2 is contemplated by this disclosure. The consumer completed approval cards 2, signifying consumer pre-authorization for a funds transfer transaction, are returned to the vendor or billing service provider, preferably the billing service provider. The approval cards 2 acknowledge that, at individual consumer initiated times, the billing service provider (or vendor) is to electronically transfer funds into appropriate vendors' (or vendor's) accounts.

Consumer payment transaction data base files 1a are generated by the computer means 1, or preferably the first computer configured for this service, from the returned approval cards 2 and stored for further action. These consumer payment transaction files 1a contain unique information for vendor associated consumers (since a billing service provider may have many vendors each consumer needs to be associated with the appropriate vendor) such as; consumers' identifying codes and addresses, vendors' identification data, identification data and account numbers for both consumers' and associated vendors' depositories (banks or similar facilities), consumers' depository account numbers, electronic funds transfer information, goods or services rendered, amounts due, and similar data.

Vendor data base files 1b are generated by the computer means 1. These files 1b contain data (such as debit and credit transactions) relating to the consumers' payment records and are periodically updated. Once the computer means 1 has created this data base 1b, depending upon the particular requirements of a vendor, the data base 1b could be stored at locations other than the billing service provider's facilities. A vendor may request that the vendor data base files 1b be transmitted to computer means other than the billing service provider's computer means (first or second computers) and be stored at the vendor's own place of business or with an independent data storage provider.

At vendor agreed to times, the computer means 1, or preferably by a dedicated (computing and statement producing means) second computer, initiates the billing process 3. Consumer payment transaction data base files 1a are employed in this process to generate vendor associated consumer bills 4. When the bills are generated, the consumer payment transaction data base files 1a are updated, preferably nightly, to reflect the current billing conditions.

The bill 4 or remittance device is generally one of two types, but similar variations would be obvious to one skilled in the art. Option 1 4a is a bill 4 comprising a plurality of separate forms, preferably two forms. In the preferred two form bill 4, one form is a standard statement for debits and credits and any messages, advertisements, or similar information. The second form is a remittance document or consumer pre-authorized funds transferal document encoded with unique current billing indicium containing information obtained from the updated consumer payment transaction data base files 1a. When more than these two forms are present in the preferred bill 4, the other forms are separate fliers for advertisements or other informational literature.

The remittance document is of any suitable size, for convenient automated processing and mailing, from common stationary or business document proportions to preferably postcard dimensions. The remittance document has front and back sides. The remittance document is either a form returnable within a windowed envelope provided in the original bill mailer or, alternatively, it is returned directly, if it is supplied to the consumer in the form of a postcard. Either the postcard like remittance document or the remittance document with relevant information detectable through a window in the return envelope is pre-addressed for mail return to the vendor or the billing service provider. The postage for the remittance document can be either directly provided by the consumers or prepaid through the billing process 3. The unique current billing indicium and vendor's or billing service provider's address are printed on either side of the remittance document, preferably both are printed on the same side. The encoded information, the unique current billing indicium, is readable by automatically scanning either the remittance document directly, if the postcard like remittance document is used, or the remittance document through a window in the return envelope with an indicium sensitive device. Preferably, the indicium is in the form of a bar code and the scanning device is a bar code reader.

Option 2 4b is a bill 4 or remittance device comprising combined, but separable by tearing or cutting, statement document, remittance document, and other informational materials. Preferably the bill 4 or remittance device comprises a combined, but separable, statement document and remittance document. As with Option 1 4a, the remittance document of Option 2 4b is appropriately sized for either postcard like return or windowed envelope return, two sided, pre-addressed, possibly with postage prepaid, and encoded with machine readable unique current billing indicium readable directly or through the window in the return envelope. Any like combination of Option 1 4a with Option 2 4b would be obvious to one skilled in the art.

Regardless of the option (Option 1 4a, Option 2 4b, or a similar combination of the two) selected for a particular billing, each remittance document has appropriate areas, lines, boxes, domains, or similar regions for necessary consumer fill-in responses or disposition action markings. A consumer must note (by checking a box on the remittance document, by signing on a line on the remittance document, or by other similar action) acceptance of the statement fees. If the consumer disagrees with the statement values (such as the amount owed, the services rendered, or similar events or quantities), this too must be noted in an appropriate manner (box checking or like action) on the face of the remittance document. These notations or disposition action markings, like the unique indicium, are machine readable for automated scanning. In the case of a remittance document that is to be returned within an envelope, the envelope has at least one window exposing the acceptance action and the indicium.

Once the bills 4 are prepared, they are mailed 5 to the consumers for action. If satisfying conditions are fulfilled, the return of the remittance document 6 (from either bill 4 option) to the billing service provider triggers or initiates the electronic transfer of funds. To determine the disposition action, satisfying conditions during verification 8, of the remittance documents they are automatically scanned 7 by a device capable of reading the encoded current billing indicium and disposition action markings, preferably by a bar code reader scanning the remittance documents for unique bar codes and disposition action markings.

The remittance document's indicium, preferably a bar code, is scanned for verification 8 against the unique current billing indicium in the consumer payment transaction data base files 1a to establish the authenticity of the remittance document. The verification 8 process (or matching process) results in electronic signals being sent from the computer means 1, preferably the first computer, to the automated processing machine that processes the remittance documents.

If there is no match achieved in the verification 8 process, the document is sent to a manual processing 9 work station and processed. This processing is comprised of verifying the unique indicium, researching the vendor files, and attempting to match the document to the file. If a match occurs, the document is reentered into the system with a corrected indicium, or manually entered at a work station computer means 1 terminal. If the account status is not resolved, the document is processed by non-automated remittance system means.

When a match occurs in the verification 8 process, further processing occurs in which current consumer payment transaction disposition data is collected. This current consumer payment transaction disposition data contains the information as to whether a consumer agrees or disagrees with the billing statement. If the scanner detects a notation indicating a disagreement with the billing statement 10, the remittance document is referred to a manual processing work station. The resolution of disputes over billing statements are resolved by applying a consumer associated vendor's rules.

If an exception (disagreement over the statement) is not indicated in the current consumer payment transaction disposition data, the computer means 1, preferably the first computer, automatically updates the consumer payment transaction data base files. Further, transmittal files are created to initiate the payment transaction 11.

The electronic funds transfer transactions are initiated by transmitting the transaction information, held in the transmittal files, preferably to a host depository 12 by any suitable means such as telephone transmission, satellite transmission, and the like. However, if a sole vendor is employing the subject invention, the transmitting of the initiating transactions can be to the vendor's own depository 12. Prior to the requested transactions, the host depository 12 (preferably a bank) has agreed with the billing service provider to act as the legal agency for conducting the inter-depository funds transfers. The host depository 12 (or vendor's depository) enters the national EFT (Electronic Funds Transfer) or similar network and activates the ACH (Automatic Cash Handling) or equivalent system for each consumer and consumer associated vendor, thereby transferring the desired funds. To maintain currency, the vendor data base files 1b are periodically updated, preferably daily, to reflect these transactions.

The EFT network is a system employed by the United States banking community for electronic movements of cash transactions. This process is replacing checks as a means of moving cash from one bank to another. The ACH system is an electronic process of moving cash from one account to another.

The invention has now been explained with reference to specific embodiments. Other embodiments will be suggested to those of ordinary skill in the appropriate art upon review of the present specification.

Although the foregoing invention has been i 0 described in some detail by way of illustration and example for purposes of clarity of understanding, it will be obvious that certain changes and modifications may be practiced within the scope of the appended claims.

What is claimed is:

1. For billing individual consumers, an automated remittance billing system for electronically transferring into a plurality of vendor depository accounts funds from a plurality of vendor associated consumer depository accounts, wherein said funds correspond to an amount due from each said consumer to said vendor, comprising:

means for pre-authorizing said transferring of funds;

a remittance document encoded with a single unique current billing indicium that includes a current indication of said amount of funds due to said vendor and said remittance document has a disposition action marking area for noting by each consumer acceptance of or disagreement with said amount due;

computer means of said billing service provider having vendor data base files for said vendors and consumer payment transaction data base files for vendor associated consumers programmed to:

control and maintain currency of said automated remittance system;

verify upon receipt of a returned remittance document said remittance document's indicium by comparing said remittance document's indicium to said payment transaction data base files;

process said verified remittance documents by creating current transmittal data base files; and initiate said transfer of funds from said vendor associated consumer's account into an associated vendor's account;

means for scanning said vendor associated consumers' returned remittance documents to obtain current consumer payment transaction disposition data and transmitting said current consumer payment transaction disposition data to said computer means for said verification and processing of said transactions; and means for the remittance document triggered transmission of said transactions to said vendor associated consumers' depositories via a host depository to initiate the transfers of funds by said consumers' depositories to said associated vendors' accounts.

2. For billing individual consumers, a billing service provider's automated remittance billing system for transferring into a plurality of vendor depository accounts funds from a plurality of vendor associated consumer depository accounts, wherein said funds correspond to an amount due from each said consumer to said vendor, comprising:

means for pre-authorizing said transferring of funds;

a remittance document encoded with a single unique current billing indicium that includes a current indication of said amount of funds due to said vendor and said remittance document has a disposition action marking area for noting by each consumer acceptance of or disagreement with said amount due;

computer means of said billing service provider having vendor data base files for said vendors and consumer payment transaction data base files for said vendor associated consumers programmed to:

generate said remittance document;

control and maintain currency of said automated remittance system;

verify upon receipt of a returned remittance document said remittance document's indicium by comparing said remittance document's indicium to said payment transaction data base files;

process said verified remittance documents by creating current transmittal data base files; and initiate said funds transfer upon said verification of said remittance document;

means for scanning said returned remittance documents to obtain current consumer payment transaction disposition data and transmitting said current consumer payment transaction disposition data to said computer means for said verification and processing of said transaction; and means for the remittance document triggered transmission of said transactions to said vendor associated consumers' depositories via a host depository to initiate said transfers of funds by said consumers' depositories to said associated vendors' accounts.

3. For billing individual consumers, a billing service provider's automated remittance billing system for transferring into a plurality of vendor depository accounts funds from a plurality of vendor associated consumer depository accounts, wherein said funds correspond to an amount due from each said consumer to said vendor, comprising:

means for pre-authorizing said transferring of funds;

a remittance document encoded with a single unique current billing indicium that includes a current indication of said amount of funds due to said vendor and said remittance document has a disposition action marking area for noting by each consumer acceptance of or disagreement with said amount due;

computer means of said billing service provider comprising:

a first computer programmed to;

control said system having vendor data base files for said vendors and consumer payment transaction data base files for said vendor associated consumers;

verify upon receipt of a returned remittance document said remittance document's indicium by comparing said remittance document's indicium to said payment transaction data base files;

process said verified remittance documents by creating current transmittal data base files; and initiate said transfer of funds from said vendor associated consumer's account into an associated vendor's account;

a second computer coupled to said first computer programmed to generate said remittance document having unique current billing indicium for each of said vendor associated consumers;

a bar code reader for scanning said returned remittance documents to obtain current consumer payment transaction disposition data and transmitting said current consumer payment transaction disposition data to said first computer for verification and processing of said transactions comprising creating current transmittal data base files; and means for the remittance document triggered transmission of said transactions from said current transmittal data base files to said vendor associated consumers' depositories via a host depository to initiate said transfers of funds by said consumers' depositories to said associated vendors' accounts.

* * * * *